(12) United States Patent
Ogawa

(10) Patent No.: US 7,814,331 B2
(45) Date of Patent: Oct. 12, 2010

(54) AUTHENTICATION APPARATUS, AUTHENTICATION METHOD, AND PROGRAM

(75) Inventor: Hideharu Ogawa, Tokyo (JP)

(73) Assignee: Passology Co., Ltd., Tokyo (JP)

( * ) Notice: Subject to any disclaimer, the term of this patent is extended or adjusted under 35 U.S.C. 154(b) by 555 days.

(21) Appl. No.: 10/379,770

(22) Filed: Mar. 3, 2003

(65) Prior Publication Data

US 2005/0027990 A1 Feb. 3, 2005

(30) Foreign Application Priority Data

Mar. 5, 2002 (JP) ............................. 2002-058759

(51) Int. Cl.
*G06F 21/00* (2006.01)
*G06F 7/04* (2006.01)
*G06F 17/30* (2006.01)
*G06F 15/16* (2006.01)

(52) U.S. Cl. ........................... 713/184; 726/5; 726/18; 726/19

(58) Field of Classification Search ................ 713/184; 726/18
See application file for complete search history.

(56) References Cited

U.S. PATENT DOCUMENTS

| | | | | |
|---|---|---|---|---|
| 4,962,530 A | * | 10/1990 | Cairns | 713/183 |
| 5,724,423 A | * | 3/1998 | Khello | 713/184 |
| 5,768,382 A | * | 6/1998 | Schneier et al. | 380/251 |
| 6,122,402 A | * | 9/2000 | Arai et al. | 382/232 |
| 6,122,403 A | * | 9/2000 | Rhoads | 382/233 |
| 6,131,085 A | * | 10/2000 | Rossides | 705/1 |
| 6,314,519 B1 | * | 11/2001 | Davis et al. | 726/4 |
| 6,553,129 B1 | * | 4/2003 | Rhoads | 382/100 |
| 6,850,252 B1 | * | 2/2005 | Hoffberg | 715/716 |
| 6,859,445 B1 | * | 2/2005 | Moon et al. | 370/335 |

(Continued)

OTHER PUBLICATIONS

Simmons, Gustavus J. "A Protocol to Provide Verifiable Proof of Identity and Unforgeable Transaction Receipts". IEEE Journal on Selected Areas in Communications. Pub Date: May 1989. Relevant pp. 435-447. Found on the World Wide Web at: http://ieeexplore.ieee.org/stamp/stamp.jsp?tp=&arnumber=17706.*

*Primary Examiner*—William R Korzuch
*Assistant Examiner*—Jeremiah Avery
(74) *Attorney, Agent, or Firm*—Mitchell P. Brook; Luce, Forward, Hamilton & Scripps LLP

(57) ABSTRACT

A generating section generates a presentation symbol string for receiving a next authentication request to an authenticated ID, a storing section stores a transformation rule and a sending destination of the presentation symbol string to be associated with each ID, a sending section sends "the generated presentation symbol string" to a display terminal, which is "the sending destination of the presentation symbol string stored in the storing section to be associated with the authenticated ID", an updating section causes the storing section to further store the presentation symbol string sent to be associated with the authenticated ID to perform update, a receiving section receives an authentication request that designates an ID and a transformed symbol string from an access terminal, and an authenticating section causes authentication of the ID to succeed when a condition is satisfied where "the received transformed symbol string matches a transformation result obtained by applying 'the transformation rule stored to be associated with the ID designated by the received authentication request' to 'the presentation symbol string stored to be associated with the ID'."

14 Claims, 11 Drawing Sheets

| ID | TRANSFORMATION RULE | PRESENTATION SYMBOL STRING SENDING DESTINATION | PRESENTATION SYMBOL STRING |
|---|---|---|---|
| | | | |
| ogawa | (1,2) (3,4) (2,1) (2,3) | ogawa@xxx.yyy.ne.jp | 1183 |
| | | | |

U.S. PATENT DOCUMENTS 6,965,914 B2 * 11/2005 Dowling ..................... 709/203
7,069,584 B1 * 6/2006 Davis ............................ 726/5
2003/0149869 A1 * 8/2003 Gleichauf ................... 713/153

* cited by examiner

Secure-OFFIC                             for ogawa 4121 7963 9775 5247
4634 7680 8608 2234
1403 9151 6639 7128
4350 8521 0258 3099

[Go!]

OneTime Password with empty-hand.

FIG.3

· OFFIC V112

4121 · 7963 · 9775
4634 · 7680 · 8608
1403 · 9151 · 6639
4350 · 8521 · 0258

Go!

[for ogawa]

FIG.6

| ID 601 | TRANSFORMATION RULE 602 | PRESENTATION SYMBOL STRING SENDING DESTINATION 603 | PRESENTATION SYMBOL STRING 604 |
|---|---|---|---|
| ------ | ------ | ------ | ------ |
| ogawa | (1,2) (3,4) (2,1) (2,3) | ogawa@xxx.yyy.ne.jp | 4121 7693 9775 5247<br>4634 7680 8608 2234<br>1403 9151 6639 7128<br>4350 8521 0258 3099 |
| ------ | ------ | ------ | ------ |

| 601 | 602 | 603 | 604 |
|---|---|---|---|
| ID | TRANSFORMATION RULE | PRESENTATION SYMBOL STRING SENDING DESTINATION | PRESENTATION SYMBOL STRING |
| ------ | ------ | ------ | ------ |
| ogawa | (1,2) (3,4) (2,1) (2,3) | ogawa@xxx.yyy.ne.jp | 1183 |
| ------ | ------ | ------ | ------ |

501

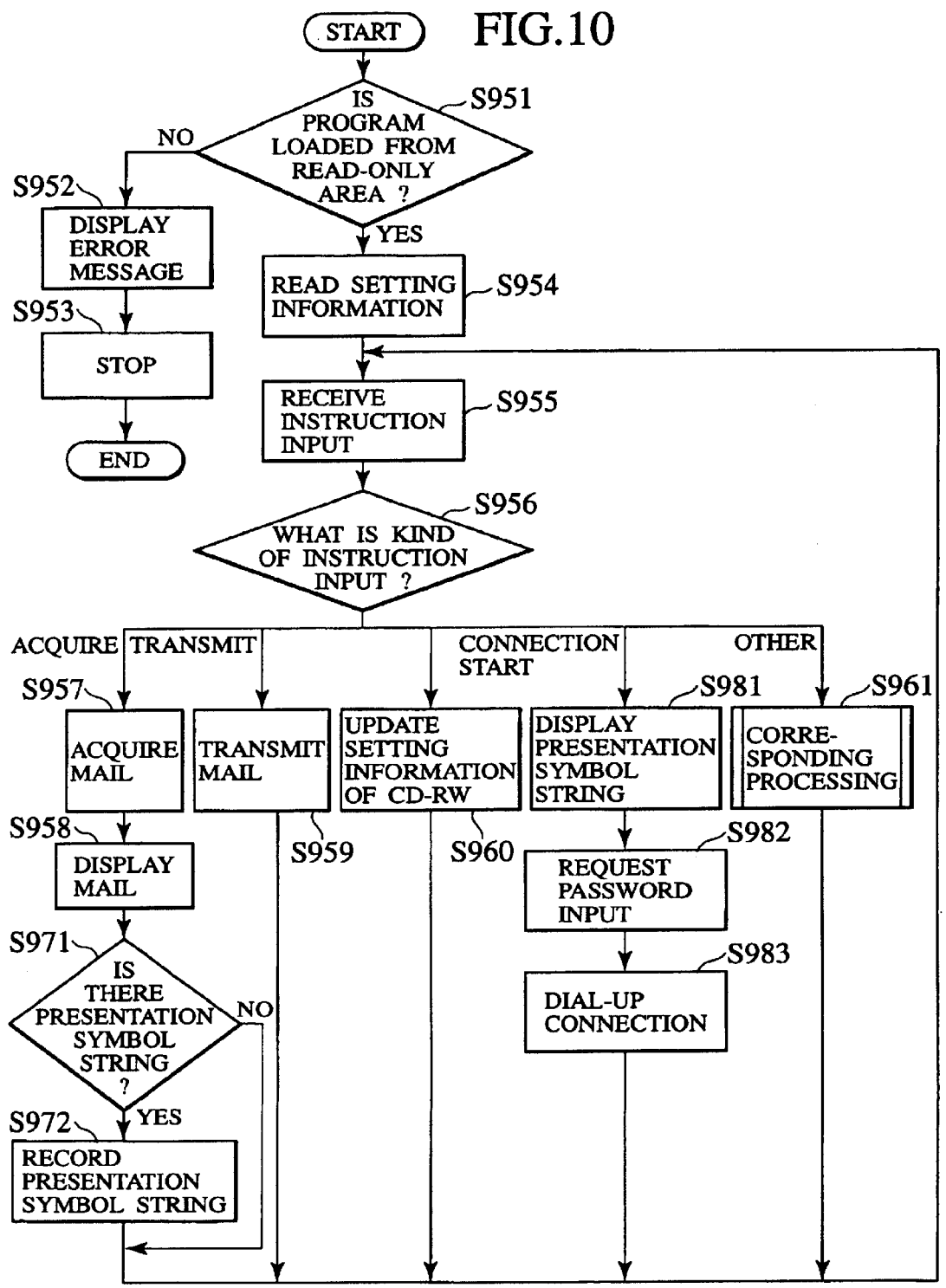

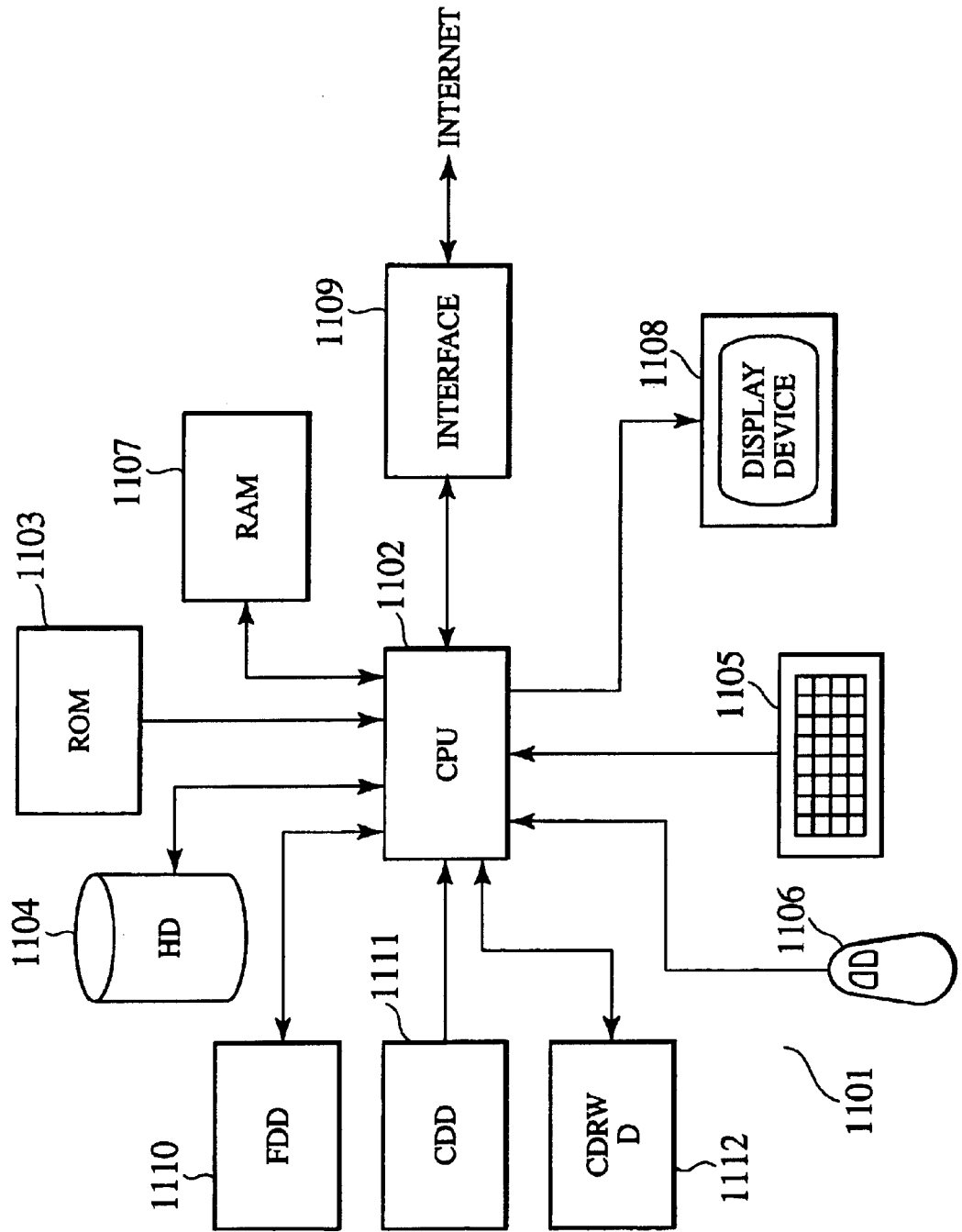

AUTHENTICATION APPARATUS, AUTHENTICATION METHOD, AND PROGRAM

BACKGROUND OF THE INVENTION

1. Field of the Invention

The present invention relates to an authentication apparatus and authentication method that are suitable for simplifying the use of a password to perform safe authentication, and a program for implementing the above apparatus and method by a computer.

2. Description of the Related Art

When users desire to gain access to various resources placed in the Internet and to receive Internet connection service by a dial-up connection, passwords are widely used at the present time as a method for determining whether such users can receive the resource and service.

The user inputs an ID (Identifier) allocated to the resource and service that the user desires to use, and further inputs a password corresponding to the ID. When this password matches a password stored at the side that provides the resource and service, authentication succeeds and the relevant resource and service are provided to the user.

IDs are provided for each user in some cases, and the same IDs are provided in other cases. Moreover, in some instances, an authentication side stores a result, which is obtained by applying a predetermined one-way function to the password, instead of storing the password itself. Then, authentication succeeds when a calculation result, which is obtained by applying the one-way function to the password input by the user, matches the stored application result.

However, when the password is input as it is and transmitted through a computer communication network directly, there is a high possibility that the password will be stolen, resulting in a fear that a security problem will occur.

While, a simple and safe technique is required to send information on receiving the resource and service to the user from the authentication side when the user forgets his/her password.

The present invention has been made to solve the aforementioned problems, and an object of the present invention is to provide an authentication apparatus and authentication method that are suitable for simplifying the use of password to perform safe authentication, and a program for implementing the above apparatus and method by a computer.

SUMMARY OF THE INVENTION

In order to attain the above object, the following invention is disclosed in accordance with the principle of the present invention.

An authentication apparatus according to a first aspect of the present invention is an authentication apparatus that authenticates an ID allocated to each user and that comprises a generating section, a storing section, a sending section, an updating section, a receiving section, and an authenticating section. The apparatus is structured as follows:

Namely, the generating section generates a presentation symbol string for receiving a next authentication request to an authenticated ID.

While, the storing section stores a transformation rule and a sending destination of the presentation symbol string to be associated with each ID.

Moreover, the sending section sends "the presentation symbol string generated by the generating section" to "the sending destination of the presentation symbol string stored in the storing section to be associated with the authenticated ID."

Then, the updating section causes the storing section to further store the presentation symbol string sent by the sending section to be associated with the authenticated ID to perform update.

On the other hand, the receiving section receives an authentication request that designates an ID and a transformed symbol string.

Further, the authenticating section causes authentication of the ID to succeed when a condition is satisfied where "the transformed symbol string received by the receiving section matches a transformation result obtained by applying 'the transformation rule stored in the storing section to be associated with the ID designated by the authentication request received by the receiving section' to 'the presentation symbol string stored in the storing section to be associated with the corresponding ID'."

Also, in the authentication apparatus of the present invention, the authentication request received by the receiving section can be structured to be one that is sent from a terminal different from "the sending destination of the presentation symbol string stored in the storing section to be associated with the ID designated by the corresponding authentication request."

Moreover, in the authentication apparatus of the present invention, the sending destination of the presentation symbol string stored in the storing section to be associated with each ID can be structured to be a telephone number of a facsimile apparatus or an e-mail address added to a mobile terminal.

Also, in the authentication apparatus of the present invention, the generating section can be structured to generate the presentation symbol string when the use of a predetermined resource based on the authenticated ID is ended, stopped, or interrupted.

Further, in the authentication apparatus of the present invention, the generating section can be structured to generate the presentation symbol string when the authenticating section fails in authentication.

Furthermore, in the authentication apparatus of the present invention, the generating section can be structured to generate the presentation symbol string after a predetermined time period since the success in authentication by the authenticating section.

Moreover, the authentication apparatus of the present invention can be structured as follows:

Namely, the updating section causes the storing section to further store "the transformation result obtained by applying 'the transformation rule stored in the storing section to be associated with the ID designated by the authentication request received by the receiving section' to 'the presentation symbol string sent by the sending section' in place of 'the presentation symbol string sent by the sending section'" and performs update.

While, the authenticating section causes authentication of the ID to succeed when a condition in place of the relevant condition is satisfied where "the transformed symbol string received by the receiving section matches 'the transformation result stored in the storing section to be associated with the ID designated by the authentication request received by the receiving section'."

Furthermore, the authentication apparatus of the present invention can be structured as follows:

Namely, the updating section causes the storing section to further store "a transformation result obtained by applying 'the transformation rule stored in the storing section to be associated with the authenticated ID' to 'the presentation symbol string sent by the sending section' and further applying a predetermined one-way function to the result in place of 'the presentation symbol string sent by the sending section'" and performs update.

While, the authenticating section causes authentication of the ID to succeed when a condition in place of the relevant condition is satisfied where "the result obtained by applying the predetermined one function to 'the transformed symbol string received by the receiving section' matches 'the transformation result stored in the storing section to be associated with the ID designated by the authentication request received by the receiving section'."

An authentication method according to another aspect of the present invention is an authentication method that authenticates an ID allocated to each user by use of "a storing section that stores a transformation rule and a sending destination of a presentation symbol string to be associated with each ID", and that comprises a generating step, a storing step, a sending step, an updating step, a receiving step, and an authenticating step. The method is structured as follows:

Namely, the generating step generates a presentation symbol string for receiving a next authentication request to an authenticated ID.

While, the sending step sends "the presentation symbol string generated by the generating step" to "a sending destination of the presentation symbol string stored in the storing section to be associated with the authenticated ID."

Moreover, the updating step causes the storing section to further store the presentation symbol string sent by the sending step to be associated with the authenticated ID to perform update.

Then, the receiving step receives an authentication request that designates an ID and a transformed symbol string.

While, the authenticating step causes authentication of the ID to succeed when a condition is satisfied where "the transformed symbol string received by the receiving step matches a transformation result obtained by applying 'the transformation rule stored in the storing section to be associated with the ID designated by the authentication request received by the receiving step' to 'the presentation symbol string stored in the storing section to be associated with the ID'."

Also, the authentication method of the present invention can be structured as follows:

Namely, the updating step causes the storing section to further store "the transformation result obtained by applying 'the transformation rule stored in the storing section to be associated with the ID designated by the authentication request received by the receiving step' to 'the presentation symbol string sent by the sending step' in place of 'the presentation symbol string sent by the sending step'" and performs update.

While, the authenticating step causes authentication of the ID to succeed when a condition in place of the relevant condition is satisfied where "the transformed symbol string received by the receiving step matches 'the transformation result stored in the storing section to be associated with the ID designated by the authentication request received by the receiving step'."

Also, the authentication method of the present invention can be structured as follows:

Namely, the updating step causes the storing section to further store "a transformation result obtained by applying 'the transformation rule stored in the storing section to be associated with the authenticated ID' to 'the presentation symbol string sent by the sending step' and further applying a predetermined one-way function to the result in place of 'the presentation symbol string sent by the sending step'" and performs update.

While, the authenticating step causes authentication of the ID to succeed when a condition in place of the relevant condition is satisfied where "the result obtained by applying the predetermined one function to 'the transformed symbol string received by the receiving step' matches 'the transformation result stored in the storing section to be associated with the ID designated by the authentication request received by the receiving step'."

A program according to another aspect of the present invention is a program that causes a computer to function as the above-described authentication apparatus. A nonvolatile storing device, which the computer has, is used as a storing section.

The program is recorded on various kinds of computer-readable information recording media such as a flexible disk, a CD-ROM (Compact Disk Read Only Memory), a DVD-ROM (Digital Versatile Disk ROM) and the like, and can be distributed and sold. In addition to this, the program can be distributed and sold via a computer communication network such the Internet.

BRIEF DESCRIPTION OF THE DRAWINGS

These objects and other objects and advantages of the present invention will become more apparent upon reading of the following detailed description and the accompanying drawings in which:

FIG. 3 is a display example of a presentation symbol string;

FIG. 6 is a schematic view showing a state of information stored in a storing section;

FIG. 7 is a schematic view showing a state of information stored in a storing section;

FIG. 10 is a flowchart showing a processing flow that is executed by the mailer; and FIG. 11 shows a general configuration of a typical computer to which the present invention is applied.

DETAILED DESCRIPTION OF THE PREFERRED EMBODIMENTS

First Embodiment

Figure 1:
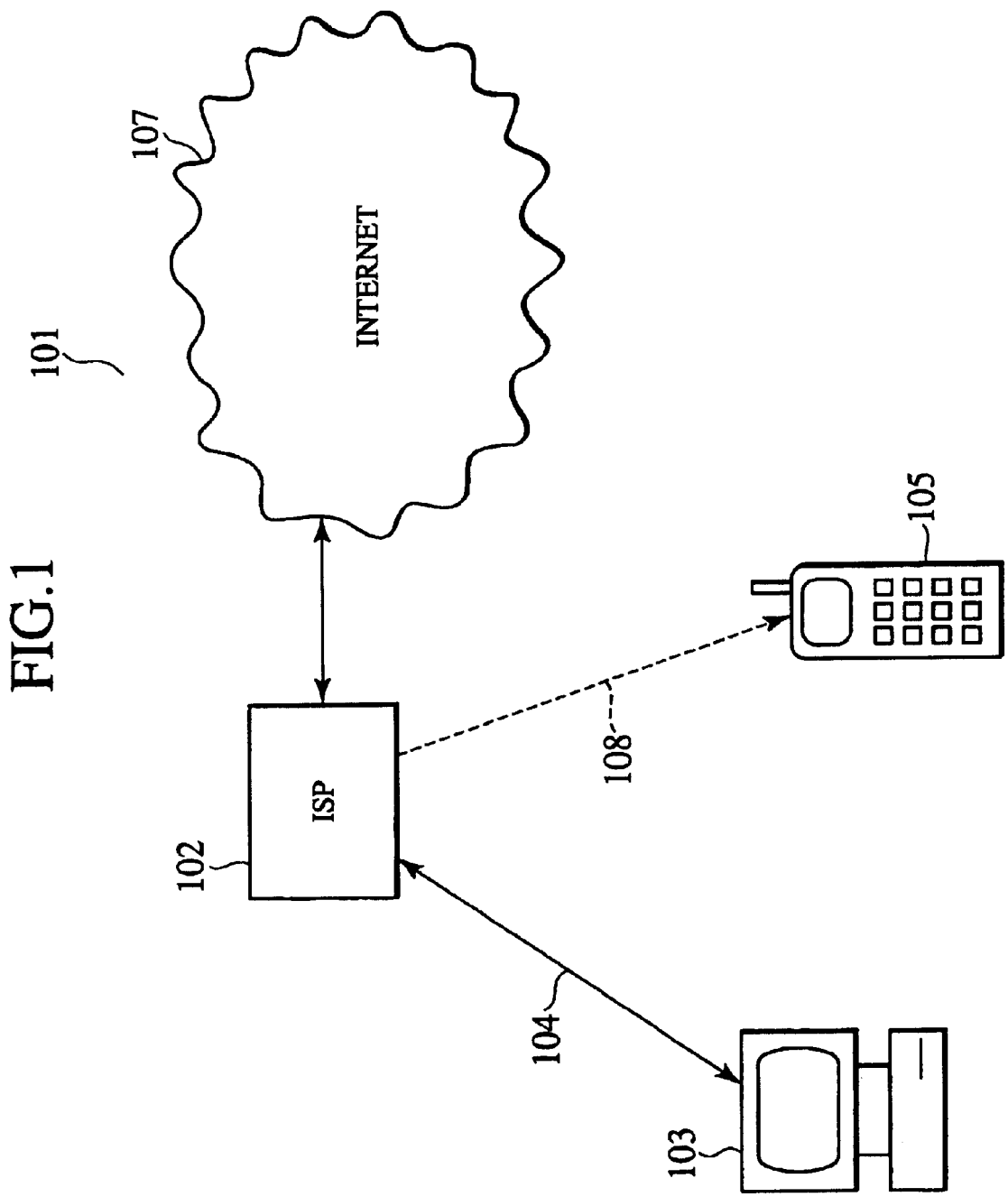
FIG. 1 is a schematic view showing a general configuration of an authentication system including an access terminal, a display terminal, and an Internet service provider according to an embodiment of the present invention.

FIG. 1 is a schematic view showing a general configuration of an authentication system including an access terminal, a display terminal, and an Internet connection provider according to an embodiment of the present invention. The following explanation is given with reference to this figure.

In an authentication system 101, a user of an Internet Service Provider (ISP) 102 makes a connection to ISP 102 from an access terminal 103 via a phone line 104. The access terminal 103 is typically a general-purpose personal computer.

The IPS 102 sends (108) in advance a presentation symbol string, which should be used at a next access request, to a display terminal 105, which the relevant user has, at the time of an access request to the Internet 107 from the user. The display terminal 105 is typically a cellular phone having a mail reception function or a facsimile reception function, a PHS (Personal Handyphone System), and various kinds of PDAs (Personal Digital Assistances). Moreover, a general facsimile apparatus can be also used as the display terminal 105.

The user outputs an authentication request from the access terminal 103 by use of the presentation symbol string sent to the display terminal 105 from ISP 102. Then, when authentication succeeds, the user can connect to the Internet 107 from the access terminal 103 via ISP 102.

Figure 2:
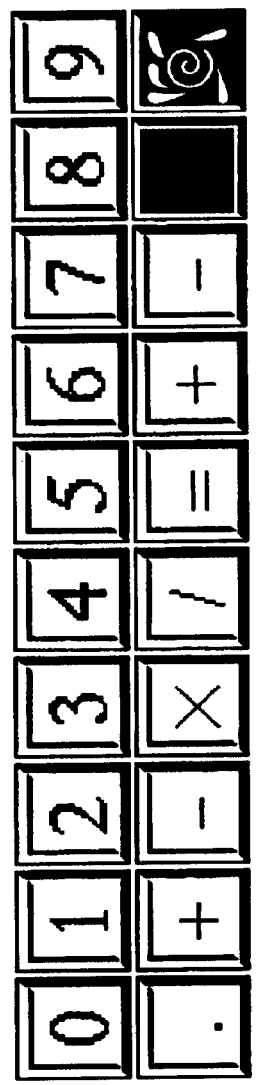
FIG. 2 is a display example of a presentation symbol string.

FIGS. 2 and 3 show display examples of the presentation symbol string. In the display example of FIG. 2, four matrixes each having 4 rows×4 columns are displayed as the presentation symbol strings. Numerals are presented for elements of each matrix.

As transformation rules, for example, the following rules can be considered:

Positions for the respective matrixes are predetermined, and symbols for the respective positions are acquired.

Moreover, a predetermined calculation (four arithmetic operations when the symbols are numerals) is made to the symbol at the relevant position.

In addition, a new position is calculated by the symbols presented at predetermined positions of the respective matrixes.

Order of symbols obtained from the respective matrixes is changed to a predetermined order.

For example, the following transformation rule is given:

In connection with the respective matrixes, the symbols of first row and second column, third row and fourth column, second row and first column, and second row and third column are obtained in order from the left to right, and the obtained symbols are arranged in order.

When this transformation rule is applied to the display example of FIG. 2, "1183" is obtained.

In the display example of FIG. 3, three matrixes each having 4 rows × 4 columns are displayed as the presentation symbol strings. Numerals are presented for elements of each matrix, similar to the aforementioned display example, and the similar transformation rules can be considered. Regarding the symbols included in the matrixes, alphabetic characters, kana characters, kanji characters, pictographs, and various kinds of symbols can be used in addition to the numerals. Moreover, instead of the matrix arrangement, the symbols may be arranged in one line, or may be arranged in accordance with a certain kind of graphics (triangle, circle, star, etc.).

The user thus obtains a password to be used in the access request this time from the presentation symbol string transmitted to the display terminal 105 in advance.

Then, the user transmits this password and his/her user ID to ISP 102 from the access terminal 103.

The ISP 102 makes a comparison among the transformation rule preregistered to be associated with the relevant user ID, the presentation symbol string previously transmitted regarding the relevant user ID and the received password to perform authentication.

When the ISP 102 succeeds in authentication, the ISP 102 provides the Internet connection service to the access terminal 103 and transmits a presentation symbol string for a next access request.

When the ISP 102 fails in authentication, the ISP 102 generates a new presentation symbol string, sends it to the display terminal 105, and requests the user to enter the password again.

The password that is sent to the ISP 102 from the access terminal 103 at the authentication time is valid only one time (hereinafter referred to as "one-time password"). Unless both the presentation symbol string and the password are stolen, the transformation rule cannot be inferred.

While, since the apparatus that displays the presentation symbol string is different from the apparatus that inputs the password, there is an extremely low possibility that both the presentation symbol string and the password will be stolen.

Further, in the aforementioned system, since a new presentation symbol string is displayed on the display terminal 105 every failure in authentication, there is an extremely low possibility that security will be broken by the method "inputting the password continuously to try to access" unless the display terminal 105 is stolen.

The following specifically explains the aforementioned authentication processing executed by the authentication apparatus such as ISP 102.

Figure 4:
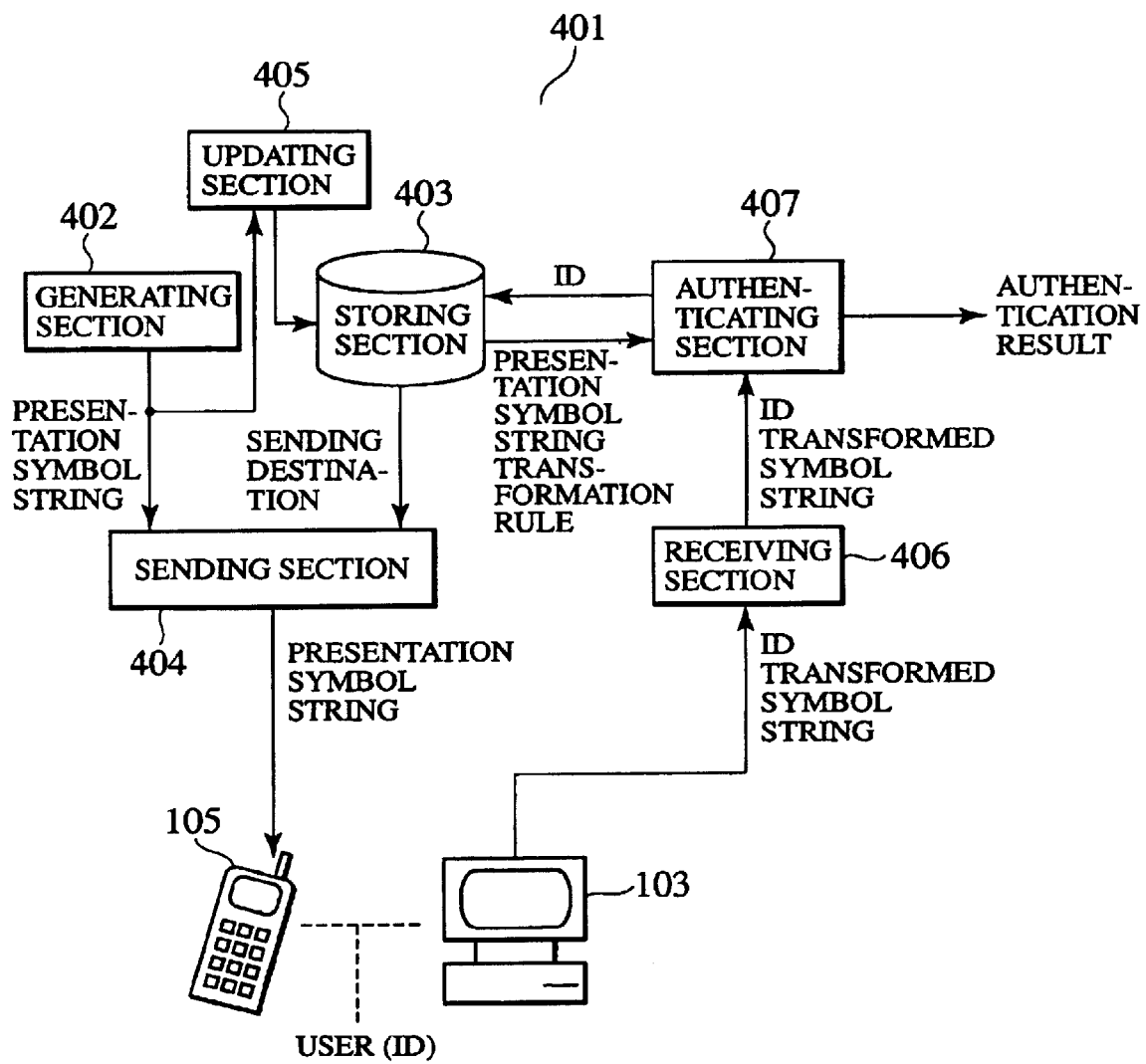
FIG. 4 is a schematic view showing a general configuration of an authentication apparatus according to an embodiment of the present invention.
Figure 5:
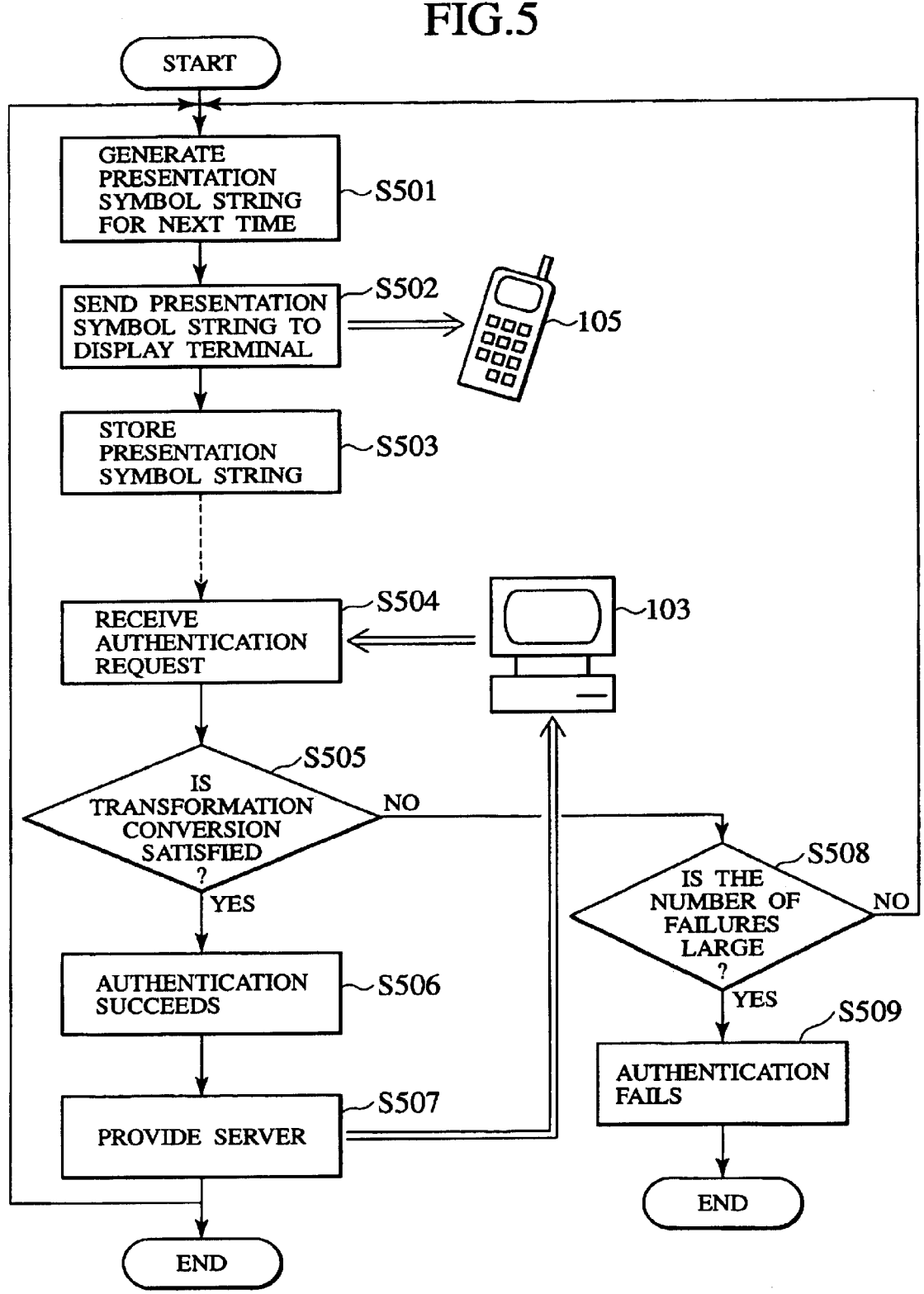
FIG. 5 is a flowchart showing the flow of control in an authentication method executed by the authentication apparatus.

FIG. 4 is a schematic view showing a general configuration of an authentication apparatus according to an embodiment of the present invention. FIG. 5 is a flowchart showing the flow of control in an authentication method executed by the relevant authentication apparatus. The following explanation is given with reference to these figures.

An authentication apparatus 401 authenticates an ID allocated to each user, and includes a generating section 402, a storing section 403, a sending section 404, an updating section 405, a receiving section 406, and an authenticating section 407.

First, the generating section 402 generates a presentation symbol string for receiving a next authentication request with respect to an authenticated ID (step S501).

While, the storing section 403 prestores a transformation rule, a sending destination of the presentation system string to be associated with each ID. FIG. 6 is a schematic view showing a state of information stored in the storing section 403. According to this embodiment, a table 501 is stored in the storing section 403. Each row of the table 501 corresponds to each user, and an ID, a transformation rule, a sending destination of the presentation symbol string are stored in columns 601, 602, 603, respectively.

In the example in the figure, "ogawa" as an ID, information corresponding to "first row and second column, third row and fourth column, second row and first column, second row and third column" as a transformation rule, and "ogawa@xxx.yyy.ne.jp" corresponding to a cellular phone email address for "ogawa" as a sending destination of the presentation symbol string are stored, respectively.

As in the above embodiment, in the case where the sending destination of the presentation symbol string is a mobile terminal for receiving mails such as a facsimile apparatus, a cellular phone, a PDA, etc., one that is stored in the column 603 is a telephone number for a facsimile apparatus or an email address added to the mobile terminal.

After that, the sending section 404 sends "the presentation symbol string generated by the generating section 402" to "the sending destination of the presentation symbol string stored in the storing section 403 to be associated with the relevant authenticated ID" (step S502). As mentioned above, the sending destination of the presentation symbol string is typically the user's. display terminal 105.

Then, the updating section 405 causes the storing section 403 to further store the presentation symbol string sent from the sending section 404 to be associated with the relevant authenticated ID and performs update (step S503). FIG. 6 further shows a state that the relevant presentation symbol string is stored in the column 604.

While, the receiving section 406 receives an authentication request that designates an ID and a transformed symbol string (corresponding to "password" in the above explanation) (step S504). As explained above, the relevant authentication request is typically issued from the relevant user's access terminal 103.

Moreover, the authenticating section 407 checks whether a condition is satisfied where "a transformed symbol string received by the receiving section 406 matches 'a transformation result' obtained by applying 'the transformation rule stored in the storing section 403 to be associated with the ID designated by the authentication request received by the receiving section 406' to 'the presentation symbol string stored in the storing section 403 to be associated with the corresponding ID' (step S505)."

When the condition is satisfied (step S505; Yes), authentication of the relevant ID succeeds (step S506). The resource and service are provided in accordance with the authentication (step S507), and the process flow goes back to step S501 and a presentation symbol string is generated and sent for a next authentication request.

On the other hand, when the condition is not satisfied (step S505; No), the authentication resultantly fails and it is checked whether the authentication continuously fails predetermined times (step S508). When the number of failures in the authentication is small (step S508; No), the processing flow goes back to step S501. When the authentication continuously fails predetermined times, this is recognized as a challenge to break the security of the relevant ID, and a predetermined report on the failure in the authentication is sent (step S509), and this processing is ended.

In addition, as described in the above embodiment, it is desirable that the authentication request received by the receiving section 406 should be sent from a terminal (corresponding to "access terminal 103" in the above embodiment), which is different from "the sending destination of the presentation symbol string stored in the storing section 403 to be associated with an ID designated by the relevant authentication request (corresponding to "display terminal 105" in the above embodiment)."

Additionally, according to the aforementioned embodiment, in step S507, the resource and service are provided and the processing flow goes back to step S501 and the regeneration and retransmission of the presentation symbol string are performed for the purpose of a next authentication request. However, the regeneration and retransmission of the presentation symbol string may be performed at the time of ending/stopping/interrupting the use of the resource and service. For example, in consideration of the use of the authentication apparatus 401 at the ISP 102, when a connection between the access terminal 103 and the WPS 102 via the phone line 104 is disconnected, the method for performing the regeneration and retransmission of the presentation symbol string can be considered.

Furthermore, it is possible to adopt the specific form that reuses the same presentation symbol string for only a predetermined time period. In this case, the regeneration and retransmission of the presentation symbol string are performed after a predetermined time period (for example, "one month", "one week", and the like) since the success in the authentication.

In this way, the apparatus that becomes widespread such as a facsimile apparatus, cellular phone, PDA and the like is used, making it possible to construct the safe authentication system using one time password.

Second Embodiment

The above-mentioned embodiment has explained that the generated presentation symbol string is directly stored in the column 604 of the table 501 of the storing section 403. While, in this embodiment, the updating section 405 causes the storing section 403 to further store "a transformation result obtained by applying the transformation rule stored in the storing section 403 to be associated with the relevant authenticated ID" to "the presentation symbol string sent by the storing section 404" in place of "the presentation symbol string sent by the storing section 404" and performs update.

Accordingly, as shown in FIG. 7, in this embodiment, the application result of the transformation rule is recorded in the column 604.

In response to this, the authenticating section 407 causes authentication of the relevant ID to succeed when a condition place of the relevant condition is satisfied where "the transformed symbol string received by the receiving section 406 matches 'the transformation result stored in the storing section 403 to be associated with the ID designated by the authentication request received by the receiving section 406'."

Third Embodiment

In this embodiment, the relationship between the password, which the user inputs, and information stored in the table 501 is made more complicated by use of the one-way function. In other words, the updating section 405 causes the storing section 403 to further store "a transformation result obtained by applying 'the transformation rule stored in the storing section 403 to be associated with the relevant authenticated ID' to 'the presentation symbol string sent by the storing section 404' and further applying a predetermined one-way function to this result in place of 'the presentation symbol string sent by the storing section 404'" and performs update.

Accordingly, "the transformation result obtained by applying the predetermined one-way function to the application result of the transformation rule to the presentation symbol string" is recorded in the column 604 of the table 501 of the storing section 403.

As the one-way function, various kinds of hash functions and a crypt ( ) function used in user authentication at various kinds of operating systems (including UNIX (trademark) etc.) can be used.

In response to this, the authenticating section 407 causes the authentication of the relevant ID to succeed when a condition in place of the relevant condition is established where "the result obtained by applying the predetermined one-way function to 'the transformed symbol string received by the receiving section 406' matches 'the transformation result stored in the storing section 403 to be associated with the ID designated by the authentication request received by the receiving section 406'."

Fourth Embodiment

The above-mentioned embodiment has explained as a typical example that the display terminal 105 and the access terminal 103 are different apparatuses. In this embodiment, the recording medium is used as a method for implementing "different apparatuses."

The recoding medium is one that has a readable and writable area such as a CD-RW (Compact Disk ReWritable). In the CD-RW, it is possible to set a readable and writable area and a read-only area. Accordingly, the following information is recorded on the read-only area:

An authentication request program necessary for an authentication request to ISP 102.

An e-mail receiving program.

On the readable and writable area, the following information is recorded:

The latest presentation symbol string obtained at the previous accessing time.

When the user starts up the authentication request program by an arbitrary access terminal 103 (instead of the user's terminal, any terminal may be used if a connection request can be output to the ISP), the latest presentation symbol string is displayed on the screen.

Then, the user outputs an authentication request to the ISP 102. In this case, the user's ID and the transformed symbol string, serving as a password, obtained by transformation from the presentation symbol string are given to the ISP 102.

When the ISP 102 succeeds the authentication, a presentation symbol string for a next access as an e-mail is transmitted to the user. When the receiving program receives the e-mail, this is recorded on the readable and writable area as "the latest presentation symbol string."

As a result, the user can output an authentication request and gain access to the same ISP 102 from any access terminal 103 if he/she carries only the recording medium.

Figure 8:
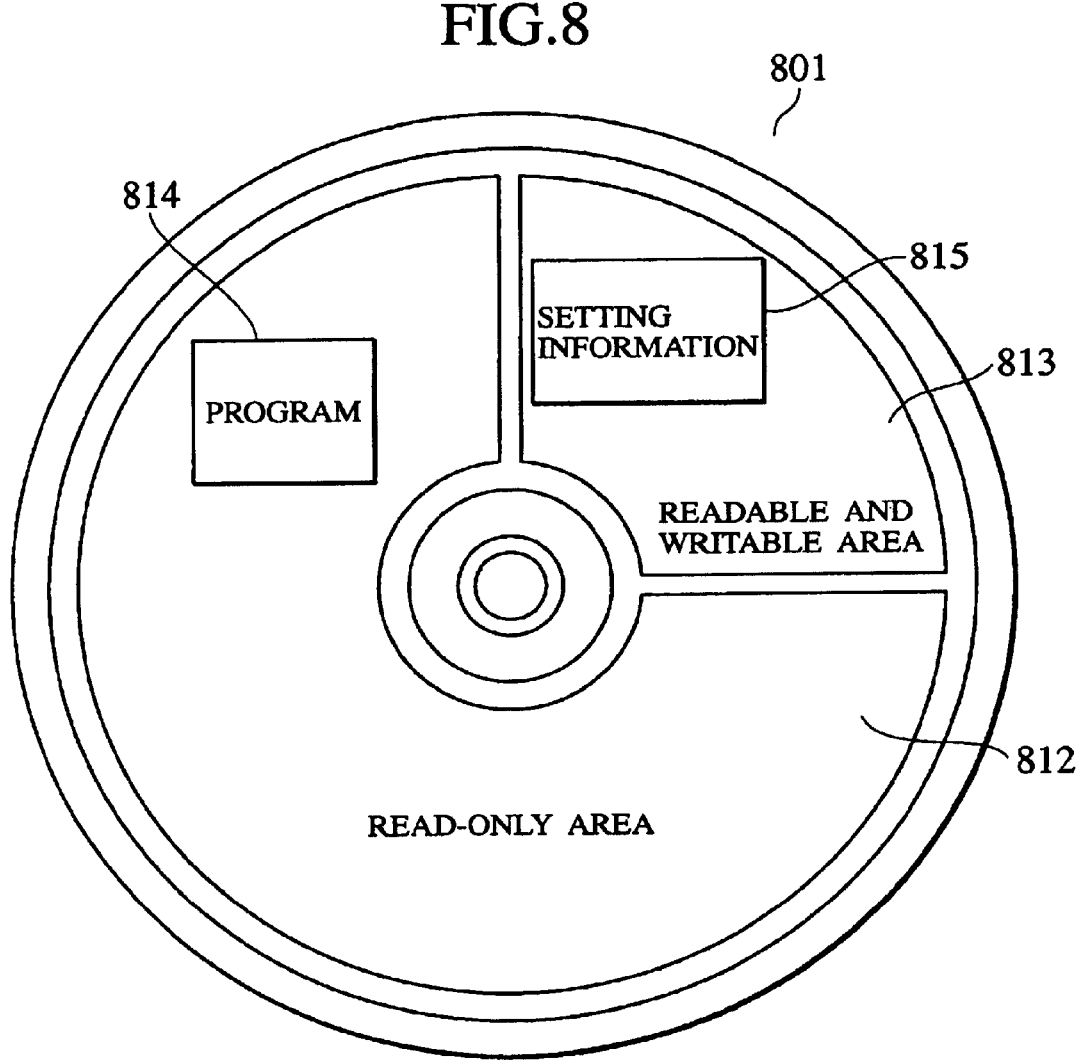
FIG. 8 is a schematic view showing a general configuration of a computer-readable information recording medium.

Additionally, the following explains the specific form of such CD-RW. FIG. 8 is a schematic view showing a general configuration of a computer-readable information recording medium according to this embodiment.

An information recording medium 801 is formed of a CD-RW. In connection with the CD-RW, 12 cm and 8 cm sized CD-RWs and card-shaped and business card-shaped CD-RWs are used. In the case where the card-shaped CD-RW is used, the CD-RW can be used as a membership certificate of a provider that manages the relevant POP/IMAP/SMTP server by printing various kinds of information on the surface thereof.

In the information recording medium 801, a read-only area 812 and a readable and writable area 813 are prepared. Such two kinds of areas can be prepared in the CD-RW.

In addition, the positions of the read-only area 812 and readable and writable area 813 in this figure are based on the conceptual way of thinking. In actual, various physical positions may be possible. For example, each area is positioned at a predetermined track, they are positioned at a plurality of tracks in the form of stripe, or the interior of each track is divided and each area is positioned in the form of sector. Then, any physical location may be adopted.

On the read-only area 812, a program is recorded in advance. This program has a function as a mailer. It is desirable that the program should have such a function that manages a dial-up connection to the provider. Since a program 814 is recorded on the read-only area 812, it is possible to prevent dangers such as a careless deletion and an alternation caused by a malicious virus program.

On the readable and writable area 813, setting information 815 is recorded. The setting information 815 includes, for example, IP addresses and domain names of a POP/IMAP server and an SMTP server, a user name of the relevant user. Moreover, in the case where the program 814 functions as a dial-up connection to the provider, information such as a telephone number for dial-up connection, user name, various settings (an IP address of a DNS server, etc.) of TCP/IP connection, and the like are included therein. Furthermore, the latest presentation symbol string is recorded as mentioned above.

When the information recording medium 801 is loaded on a computer and the program 814 recoded on the read-only area 812 is executed by the computer, the computer functions as a mailer by the program 814.

Figure 9:
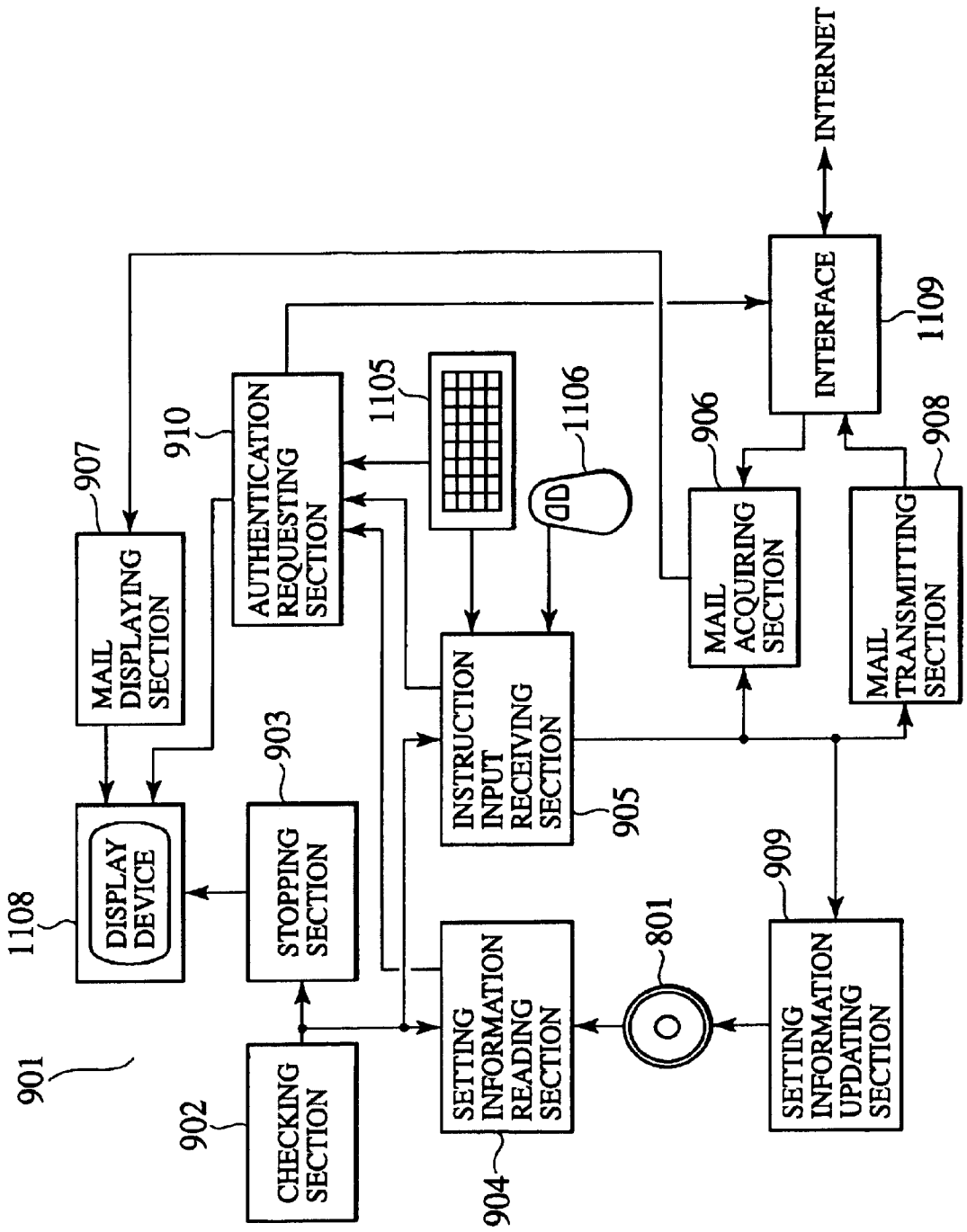
FIG. 9 is a schematic view showing a general configuration of each component of a mailer implemented by a computer when the computer executes a program recorded on the information recording medium.

FIG. 9 is a schematic view showing a general configuration of each component of the mailer implemented by the computer when the computer executes the program 814 recorded on the read-only area 812 of the information recording medium 801. Moreover, FIG. 10 is a flowchart showing a processing flow that is executed by the mailer. The following explanation is given with reference to these figures.

In this embodiment, a mailer 901 implemented by the computer includes a checking section 902, a stopping section 903, a setting information reading section 904, an instruction input receiving section 905, a mail acquiring section 906, a mail displaying section 907, a mail transmitting section 908, a setting information updating section 909, and an authentication requesting section 910. The functions of these sections are performed when a CPU and each section of the computer work together.

First, when the program 814 is started, the checking section 902 checks whether the computer reads the relevant program 814 from the read-only area 812 of "the information recording medium 801 having the readable and writable area 813 and the read-only area 812" and executes the program (step S951).

Then, when it is checked that the computer does not read the program from the read-only area 812 to execute the program (step S951: No), the stopping section 903 displays an error message (step S952) and stops the execution of the program 814 (step S953).

As a result, the program 814 is executed only when it is read from the read-only area 812 of CD-RW by the computer. Accordingly, for example, it is possible to prevent unauthorized duplication of the program 814. Moreover, when the user copies the program 814 in the hard disk 1104 carelessly, the copied program is sometimes invaded by a computer virus. However, even in such a case, execution of the program can be prevented as much as possible.

While, when it is checked that the program is read from the read-only area 812 and executed (step S951: Yes), the setting information reading section 904 reads setting information 815 recorded on the readable and writable area 813 into RAM (step S954).

Then, the instruction input receiving section 905 receives an instruction input from the user (step S955) and checks the instruction of the instruction input (step S956). The instruction is input from an input device such as a keyboard 1105 and a mouse 1106.

When the received instruction input is a mail acquisition instruction (step S956: acquisition), the mail acquiring section 906 acquires an e-mail via an interface 1109 from a server designated by setting information 815 read by RAM 1107 (step S957).

In addition, an e-mail can be acquired as it is left in the POP/IMAP server under POP/IMAP protocol. In this embodiment, the e-mail can be desirably obtained in such a specific form. If the e-mail is appropriately acquired as needed, there is no need to store the e-mail in a computer hard disk as a file that can be immediately read, and this makes it possible to prevent the contents of e-mail from being leaked even if the present information recording medium 801 is used at an Internet cafe and the like.

After that, the mail displaying section 907 displays the acquired e-mail on a display device 1108 (step S958). Moreover, it is checked whether the relevant e-mail includes a presentation symbol string for a next access (step S971). When it includes the presentation symbol string (step S971: Yes), this is recorded on the readable and writable area (step S972). After these processing or when it does include the presentation symbol string (step S971: No), the processing flow goes back to step S955.

When the received instruction input is a mail transmission instruction that designates a destination to be transmitted and contents to be transmitted (step S956: transmission), the mail transmitting section 908 causes a server designated by the read setting information 815 to transmit the e-mail with the designated contents to the designated destination via the interface 1109 (step S959). After the transmission, the processing goes back to the step S955.

When the received instruction input is a setting information update instruction that designates a server (POP/IMAP server), which acquires an e-mail, or a server (SMTP server), which transmits an e-mail, (step S956: setting update), the setting information updating section 909 records information of the designated server on the readable and writable area 813 of the information recording medium 801 using a CD-RWD 1112 and updates setting information 815 (step S960). After updating, the processing flow goes back to step S955.

In addition, setting update is preferably executed by a computer 11 that a user possesses himself/herself. Moreover, at this updating time, it is possible to update not only server information but also various kinds of setting information 815 such as information on user name and the like.

When the received instruction input is a connection start instruction to the ISP 102 (step S956: connection start), the authentication requesting section 910 displays the latest presentation symbol string prerecorded on the readable and writable area 813 on the screen of the display device 1108 (step S981). Then, the authentication requesting section 910 displays an authentication request dialogue to encourage the user to input his/her ID and password (result obtained by applying the presentation symbol string to the transformation rule) (step S982). The user inputs the password using the keyboard 1105 and the like to try a dial-up connection to the ISP 102 via the interface 1109 (step S982), and the processing flow goes back to step S955.

Additionally, in the case of using the CD-RW at the Internet cafe, there is no need of the dial-up connection to the ISP 102. However, in some cases, the ISP 102 performs management of user's right of use and arrangement of accounting information to an ASP (Application service Provider) in the Internet. In this case, it is possible to adopt such a specific form that allows a global IP address and a port number of the terminal, which is used by the user, to be authenticated based on the ID and password input from the authentication request dialogue.

In addition, it is rarely the case that CDRWD 1112 is prepared at the Internet cafe. Since only CDD 1111 is normally prepared at the Internet cafe, setting information 815 itself cannot be updated in overwhelming many cases. Accordingly, it is extremely rarely the case that the contents of CD-RW, which is the information recording medium 801, are broken by the computer virus and the like.

While, in the case where the apparatus having the CDRWD 1112 prepared is used, the presentation symbol string is extracted from the arrived mail and writing corresponding to only the extracted information is made onto the recording medium 801. Accordingly, even in this case, there is no room that the computer virus directly works.

When the received instruction input is an instruction besides the aforementioned instructions (step S956: other), processing corresponding to such an instruction is executed (step S961) and the processing flow goes back to step S955.

In this way, according to this embodiment, the mailer program 814 is recorded on the read-only area 812 of the CD-RW, which is the information recording medium 801, and setting information 815 is recoded on the readable and writable area 813, making it possible to receive and transmit the mail safely and easily. Particularly, the latest presentation symbol string is recorded to make it possible to perform authentication safely.

FIG. 11 shows a general configuration of a typical computer to which this information recording medium 801 is applied. The following explanation is given with reference to this figure.

A computer 1101 is controlled by a CPU (central Processing Unit) 1102. When the computer 1101 is powered on, the CPU 1102 executes an IPL (Initial Program Loader) stored in a ROM (Read Only Memory) 1103.

The IPL is a program that executes an OS (Operating System) program stored in a hard disk (HD), an FD (Flexible Disk) attached to an FDD (Flexible Disk Drive) 1110, and a CD-ROM attached to a CD-ROM (Compact Disk ROM) drive (CDD) 1111.

After starting the OS, the CPU 1102 executes an application program stored in the CD-RW, which is the information recording medium 801 of this embodiment, in accordance with the user's instruction input by the keyboard 1105 and the mouse 1106 or the contents of a setting file described in the hard disk 1104 in advance.

In addition, the program and setting information, which are recorded on the read-only area 812 and the readable and writable area 813 of the CD-RW, which is the information recording medium 801, can be read by the CDD 1111.

While, in order to write new information on the readable and writable area 813 and update written information, the CD-RW drive (CDRWD) 1112 is needed.

Once setting information 815 is recorded, the majority of processing, which is to be executed using the information recording medium 801 afterward, does not need writing onto the information recording medium 801 in many cases. Accordingly, even the computer 1101 with no CDRWD 1112 can use the information recording medium 801 of this embodiment.

The CPU 1102 uses a RAM (Random Access Memory) 1107 as a storage area for temporary working at the time of executing the program. In addition, a register and a cache (not shown), which are provided in the CPU 1102, can be as a storage area for temporary working.

To report the result to the user and show the progress of processing thereto in accordance with the execution of the program, the CPU 1102 can display the relevant information on the display device 1108 such as a liquid crystal display, a CRT (Cathode Ray Tube) and the like. In connection with the instructing operation using the mouse 1106, a cursor displayed on the screen moves according to movements of the mouse 1106 and a menu item pointed out by the cursor can be selected by clicking the mouse 1106.

The computer 1101 performs communications with the computer communication network such as the Internet via the interface 1109 such as an NIC (Network Interface Card), a modem, and the like, so that e-mail can be exchanged. The e-mail received via the interface 1109 can be used as a subject to be processed, transmission of the processed e-mail via the interface 1109, execution of the program received via the interface 1109 and the like can be carried out.

Fifth Embodiment

In the case where the dedicated mailer software is prepared to adjust to the authentication apparatus as mentioned above, the method for generating the presentation symbol string can be devised as the explanation set forth below.

Namely, the authentication apparatus and mailer software share the following information:

An algorithm for generating a random number. Regarding the algorithm, a random number is generated by giving a certain seed (including numeric information, symbol string information, etc) and a presentation symbol string is generated based on the generated random number. As the random number generation algorithm, various kinds of known algorithms can be applied.

A seed for generating a random number. Since an amount of information may be smaller than the presentation symbol string, an amount of communications may be small.

The authentication apparatus generates one seed for random number generation and transmits it to the mailer software.

The mailer software generates a presentation symbol string from the received seed using the relevant random number generation algorithm, and presents it to the user to urge the user to input a password symbol string. Then, the mailer software transmits the input password symbol string to the authentication apparatus.

On the other hand, the authentication apparatus generates a presentation symbol string from the same seed using the random number generation algorithm. The presentation symbol string generated here is the same symbol string as one generated by the mailer software.

After that, the authentication apparatus makes comparison among the generated presentation symbol string, the password symbol string transmitted from the mailer software and the transformation rule allocated to the relevant user to perform the authentication in the same manner as the aforementioned embodiment.

As the random number generation algorithm, one that operates by adding a common parameter may be adopted in addition to the aforementioned seed. In other words, as the common parameter, a different integer value (for example, integer value of 10,000 bits) is allocated to each user and the resultant is shared by the authentication apparatus and the mailer software.

In the case where the mailer software is prepared in the CD-RW as in the above, the relevant integer value is written on the read-only area and the CD-RW dedicated to the user is provided for each user. Namely, the relevant CD-RW has a meaning as a kind of "membership certificate" and the integer value of the common parameter allocated to the relevant user has a meaning as a kind of "membership number."

Then, it is assumed that the common parameter and the aforementioned seed are combined and used as "a seed for random number generation." In this case, since the common parameter is a sufficient long bit string, the number of bits of "seed", which is used in communications at the time of authentication, may be smaller than this.

In this way, unless all of the algorithm, common parameter and transformation rule are prepared, the security is broken. Accordingly, this eliminates the need for using an SSL (Secure Socket Layer) and contributes to reduce an amount of communication and improve communication speed.

In addition, it is possible to adopt such a specific form that prepares a presentation terminal serving as the following function. Namely, the presentation terminal receives a seed sent from the authentication apparatus and presents a presentation symbol string to a user. While, the user prepares a password symbol string by his/her ruler with reference to this presentation symbol string, and inputs his/her ID and password symbol string to an input device besides the presentation terminal. As a result, the ID and password symbol string are transmitted to the authentication apparatus from the input device.

This embodiment can be applied as follows: Namely, it is assumed that a cellular phone in which a small program operates and data for the program can be held is used as a presentation terminal. Then, an input device is provided at the front entrance of a house, and the input device is connected to a security managing apparatus of the relevant house. Moreover, it is assumed that the security managing apparatus is the authentication apparatus of this embodiment.

At this time, for example, a program is downloaded onto the cellular phone from the authentication apparatus and the program is executed, thereby making it possible to share an algorithm for generating a presentation symbol string from a seed between the authentication apparatus and the cellular phone. Even in this embodiment, it is possible to set processing in the case of failure in authentication, timing at which a seed is generated, and the like.

As explained above, according to the present invention, it is possible to provide an authentication apparatus and authentication method that are suitable for simplifying the use of a password to perform safe authentication, and a program for implementing the above apparatus and method by a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-58759 filed on Mar. 5, 2002 and including specification, claims, drawings and summary. The disclosure of the above Japanese Patent Application is incorporated herein by reference in its entirety.

What is claimed is:

1. An authentication apparatus that authenticates an identifier ID allocated to each user designated by an authentication request comprising:

a generating section generating randomly a human-readable presentation symbol string for an ID designated by a last authentication request after the ID is authenticated successfully;

a storing section storing a transformation rule and a presentation symbol string to be associated with each ID;

a sending section sending the presentation symbol string generated by said generating section, via a first communication path which is latest established for the authenticated ID, to a latest authenticated computer which is used by a user having the authenticated ID, in order for the latest authenticated computer to record the presentation symbol string into a portable information recording medium;

an updating section updating said storing section to store the new presentation symbol string sent by said sending section to be associated with the authenticated ID;

a receiving section receiving a new authentication request, that designates an ID and a human-readable transformed symbol string via a second communication path which is newly established for the authenticated ID, from another computer which reads the presentation symbol from said portable information recording medium, presents the read presentation symbol string to the user in order for the user to apply the user's transformation rule to the presented presentation symbol string to obtain a transformed symbol string, accepts the user's ID and the obtained transformed symbol string from the user, and sends the new authentication request designating the accepted ID and the accepted transformed symbol string to the authentication apparatus via the second communication path;

an authenticating section authenticating the ID designated by the new authentication request in the case that the transformed symbol string designated by the new authentication request matches a transformation result obtained by applying the transformation rule stored in said storing section to be associated with the ID designated by the new authentication request to the presentation symbol string stored in said storing section to be associated with the ID designated by the new authentication request; and a servicing section providing an Internet connection service or an application service for the user of the authenticated ID to access the Internet or use an application from said another computer via the second communication path, wherein, after said servicing section begins to provide the Internet connection service or the application service via the second communication path, said generating section and said sending section regard the second communication path as the latest established path for the authenticated ID and regard said another computer as the latest authenticated computer, said generating section generates a new presentation symbol, and said sending section sends the new presentation symbol to said another computer via the second communication path, in order for said another computer to store the new presentation symbol into said portable information recording medium; and through the transformation rule associated with each ID, human-readable symbols are acquired from predefined positions of a human-readable presentation symbol string, the acquired human-readable symbols are arranged in a predefined order and a human-readable transformation symbol string is obtained from the arranged result.

2. The authentication apparatus according to claim 1, wherein said receiving section receives the last authentication request from an access terminal via said second communication path, and said sending section sends the new presentation symbol to a mobile terminal which functions as the sending destination via said first communication path.

3. The authentication apparatus according to claim 2, wherein the sending destination of the presentation symbol string stored in said storing section to be associated with each ID is an e-mail address which is available in the mobile display terminal.

4. The authentication apparatus according to claim 1, wherein said generating section generates the new presentation symbol string when the use of a predetermined resource by the authenticated ID is ended, stopped, or interrupted.

5. The authentication apparatus according to claim 1, wherein said generating section generates another new presentation symbol string when said authenticating section fails in authentication of the ID to cause said sending section to send the another new presentation symbol string and said storing section to store the another new presentation symbol.

6. The authentication apparatus according to claim 1, wherein said generating section generates the new presentation symbol string every predetermined time period to cause said sending section to send the new presentation symbol string and said storing section to store the new presentation symbol.

7. The authentication apparatus according to claim 1, wherein said updating section updates said storing section to further store the transformation result obtained by applying the transformation rule stored in said storing section to be associated with the ID designated by the last authentication request received by said receiving section to the new presentation symbol string sent by said sending section in place of the new presentation symbol string sent by said sending section, and said authenticating section authenticates successfully the ID designated by the new authentication request in the case that the transformed symbol string designated by the new authentication request matches the transformation result stored in said storing section to be associated with the ID designated by the new authentication request.

8. The authentication apparatus according to claim 1, wherein said updating section updates said storing section to further store the transformation result obtained by applying to the new presentation symbol string sent by said sending section, the transformation rule stored in said storing section to be associated with the authenticated ID designated by the last authentication request and a predetermined hash function, in place of the new presentation symbol string sent by said sending section, and said authenticating section authenticates successfully the ID designated by the new authentication request in the case that the result obtained by applying the predetermined hash function to the transformed symbol string designated by the new authentication request matches the transformation result stored in said storing section to be associated with the ID designated by the new authentication request.

9. An authentication method that authenticates an identifier ID allocated to each user designated by an authentication request by use of a storing section in an authentication apparatus that stores a transformation rule and a presentation symbol string to be associated with each ID comprising:

a generating step in which the authentication apparatus generates randomly a human-readable presentation symbol string for an ID designated by a last authentication request after the ID is authenticated successfully;

a sending step in which the authentication apparatus sends the presentation symbol string generated by said generating step via a first communication path which is latest established for the authenticated ID, to a latest authenticated computer which is used by a user having the authenticated ID;

a recording step in which the latest authenticated computer receives the presentation symbol string from the authentication apparatus via the first communication path and records the received presentation symbol string into a portable information recording medium;

an updating step in which the authentication apparatus updates said storing section to store the new presentation symbol string sent by said sending step to be associated with the authenticated ID;

a presenting step in which another computer reads the presentation symbol string from said portable information recording medium and presents the read presentation symbol string to the user;

an inputting step in which the user applies the user's transformation rule to the presented presentation symbol string by said another computer to obtain a human-readable transformed symbol string and inputs the user's ID and the obtained transformed symbol string;

an accepting step in which said another computer accepts the user's ID and the obtained transformed symbol string and sends a new authentication request that designates the accepted ID and the accepted transformed symbol string via a second communication path which is newly established for the authenticated ID;

a receiving step in which the authentication apparatus receives the new authentication request that designates the ID and the transformed symbol string via the second communication path from said another computer;

an authenticating step in which the authentication apparatus authenticates successfully the ID designated by the new authentication request in the case that the transformed symbol string designated by the new authentication request matches a transformation result obtained by applying the transformation rule stored in said storing section to be associated with the ID designated by the new authentication request to the presentation symbol string stored in said storing section to be associated with the ID designated by the new authentication request; and a servicing step in which the authentication apparatus provides an Internet connection service or an application service for the user of the authenticated ID to access the Internet or use an application from said another computer via the second communication path, wherein, after said servicing step begins to provide the Internet connection service or the application service via the second communication path, said generating step and said sending step regard the second communication path as the latest established path for the authenticated ID and regard said another computer as the latest authenticated computer, said generating step generates a new presentation symbol, and said sending step sends the new presentation symbol via the second communication path, in order for said another computer to store the new presentation symbol into said portable information recording medium, and through the transformation rule associated with each ID, human-readable symbols are acquired from predefined positions of a human-readable presentation symbol string, the acquired human-readable symbols are arranged in a predefined order and a human-readable transformation symbol string is obtained from the arranged result.

10. The authentication method according to claim 9, wherein said updating step updates said storing section to further store the transformation result obtained by applying the transformation rule stored in said storing section to be associated with the ID designated by the new authentication request received by said receiving step to the presentation symbol string sent by said sending step in place of the new presentation symbol string sent by said sending step, and said authenticating step authenticates successfully the ID in the case that the transformed symbol string designated by the new authentication request matches the transformation result stored in said storing section to be associated with the ID designated by the new authentication request.

11. The authentication method according to claim 9, wherein said updating step updates said storing section to further store the transformation result obtained by applying to the new presentation symbol string sent by said sending step, the transformation rule stored in said storing section to be associated with the authenticated ID designated by the last authentication request and a predetermined hash function, in place of the new presentation symbol string sent by said sending step, and said authenticating step authenticates successfully the ID designated by the new authentication request in the case that the result obtained by applying the predetermined hash function to the transformed symbol string designated by the new authentication request matches the transformation result stored in said storing section to be associated with the ID designated by the new authentication request.

12. An authentication program product that causes a server computer to function as the authentication apparatus described in claim 1.

13. A portable information recording medium storing a terminal program, wherein, when said portable information recording medium is set to a first terminal computer, said terminal program causes said first terminal computer connected with a server computer caused to function as an authentication apparatus by an authentication program product via a first communication path, to execute:

(a1) a step of receiving a human-readable presentation symbol string from the authentication apparatus via the first communication path after an identifier ID of a user is authenticated successfully by the authentication apparatus, and (a2) a step of storing the presentation symbol string and the authenticated ID into said portable information recording medium, and wherein, when said portable information recording medium is set to a second terminal computer, said terminal program causes said second terminal computer connected with the authentication apparatus via a second communication path to execute:

(b1) a step of displaying the presentation symbol string stored in said portable information recording medium when the user requests authentication by the authentication apparatus in order for the user to apply the user's transformation rule to the displayed presentation symbol string to obtain a human-readable transformed symbol string, (b2) a step of accepting an input from the user which designates the user's ID and the transformed symbol string obtained by the user, and (b3) a step of sending to the authentication apparatus via the second communication path, an authentication request which designates the accepted ID and the accepted transformed symbol string, wherein, in the case the ID is authenticated by the authentication apparatus, said terminal program causes the second terminal computer to access the Internet or use an application via the second communication path and execute said step of receiving and said step of storing by regarding the second communication path as the first communication path, and through the transformation rule associated with each ID, human-readable symbols are acquired from predefined positions of a human-readable presentation symbol string, the acquired human-readable symbols are arranged in a predefined order and a human-readable transformation symbol string is obtained from the arranged result.

14. The portable information recording medium according to claim 13, wherein said terminal program is stored in the read only area of said portable information recording medium, and said presentation symbol string is stored In the readable-writable area of said portable information recording medium.

* * * * *